(12) United States Patent
Okuyama et al.

(10) Patent No.: US 9,227,664 B2
(45) Date of Patent: Jan. 5, 2016

(54) REAR SUB FRAME OF AUTOMOTIVE VEHICLE

(71) Applicant: MAZDA MOTOR CORPORATION, Hiroshima (JP)

(72) Inventors: Kazuhiro Okuyama, Hiroshima (JP); Fumitaka Andou, Hatsukaichi (JP); Masaya Hiramatsu, Aki-gun (JP); Makoto Nishino, Aki-gun (JP)

(73) Assignee: MAZDA MOTOR CORPORATION, Hiroshima (JP)

( * ) Notice: Subject to any disclaimer, the term of this patent is extended or adjusted under 35 U.S.C. 154(b) by 0 days.

(21) Appl. No.: 14/626,262

(22) Filed: Feb. 19, 2015

(65) Prior Publication Data

US 2015/0232126 A1 Aug. 20, 2015

(30) Foreign Application Priority Data

Feb. 20, 2014 (JP) ................................. 2014-030773

(51) Int. Cl.
 B62D 21/11 (2006.01)
 B60K 17/16 (2006.01)

(52) U.S. Cl.
 CPC .............. B62D 21/11 (2013.01); B60K 17/165 (2013.01); *B60G 2200/184* (2013.01)

(58) Field of Classification Search
 CPC . B62D 21/11; B60K 17/165; B60G 2200/184
 See application file for complete search history.

(56) References Cited

U.S. PATENT DOCUMENTS

| | | | | |
|---|---|---|---|---|
| 3,327,803 A | * | 6/1967 | Cote | B60G 3/22 180/292 |
| 8,925,941 B2 | * | 1/2015 | Cordier | B60G 3/20 180/360 |
| 2009/0212548 A1 | | 8/2009 | Frasch et al. | |
| 2014/0183834 A1 | * | 7/2014 | Okuyama | B60G 3/20 280/124.109 |
| 2015/0158529 A1 | * | 6/2015 | Leibl | B60K 17/00 180/377 |

* cited by examiner

*Primary Examiner* — Drew Brown
(74) *Attorney, Agent, or Firm* — Studebaker & Brackett PC

(57) ABSTRACT

A rear sub frame comprising a pair of side members, a front cross member, and a rear cross member. The front cross member is configured in substantially a V shape in a front view such that the front cross member slants continuously from both end portions thereof toward a central portion, in a vehicle width direction, thereof which is located below a rear differential, and that a center position, in the vehicle width direction, of a bottom portion of the front cross member which corresponds to an apex portion of the V shape is offset from a center of a vehicle body in the vehicle width direction toward a specified side which matches an offset-arrangement side of a ring gear arranged in the rear differential.

4 Claims, 11 Drawing Sheets

REAR SUB FRAME OF AUTOMOTIVE VEHICLE

BACKGROUND OF THE INVENTION

The present invention relates to a rear sub frame of an automotive vehicle, and in particular relates to the rear sub frame of the automotive vehicle, which is attached to a kick-up portion and rear frames of a vehicle body at a rear portion of the vehicle body where a rear differential is provided.

An assembly of an automotive vehicle, in which links and arms of a rear suspension are attached to a rear sub frame and then this rear sub frame is attached to a kick-up portion and rear frames of a vehicle body, is known.

Herein, the rear sub frame which comprises a pair of side members extending in a vehicle longitudinal direction at both sides, in a vehicle width direction, of the vehicle body and cross members extending in the vehicle width direction and interconnecting the pair of side members is known, for example. The rear sub frame of the automotive vehicle having rear wheels as driving wheels, in which a front cross member of the cross members is configured in substantially a V shape in a front view and a bottom portion of the front cross member which corresponds to an apex portion of the V shape is located below a rear differential of the vehicle, is also known (see US Patent Application Publication No. 2009/0212548 A1, for example).

The rear sub frame has been required to have a high rigidity for improving the responsiveness of the suspension and the like during the vehicle traveling and also to provide an appropriate NVH (noise-vibration-harshness) performance. It is preferable that the side members and the cross members of the rear sub frame be configured in as a more straight shape as possible in order to improve the NVH performance properly. Further, it is necessary that the side members and the cross members do not interfere with an exhaust pipe or the like arranged below a rear portion of the vehicle body. However, the cross member of the conventional rear sub frame disclosed in the above-described patent document includes a bending portion for avoiding any interference with the exhaust pipe or the like. In this case, since complicated vibration modes are caused by the shape of the bending portion of the cross member, it may be difficult to improve the NVH performance properly. Further, it is necessary to reinforce the cross members and the side members in order to suppress such vibration modes which has a bad influence on the NVH performance, so that the weight of the rear sub frame may become heavier improperly.

SUMMARY OF THE INVENTION

The present invention has been devised to solve the above-described problems of the conventional rear sub frame, and its object is to provide a rear sub frame of an automotive vehicle which can restrain a weight increase caused by reinforcing and improve the NVH performance, avoiding any interference with the exhaust pipe or the like arranged below the rear portion of the vehicle body.

According to the present invention, there is provided a rear sub frame of an automotive vehicle, which is attached to a kick-up portion and rear frames of a vehicle body at a rear portion of the vehicle body where a rear differential storing a ring gear therein is provided, the ring gear being arranged to be offset from a center position, in a vehicle width direction, of the rear differential, the rear sub frame comprising a pair of side members extending in a vehicle longitudinal direction at both sides, in the vehicle width direction, of the vehicle body, front end portions of which are connected to a front portion of the kick-up portion of the vehicle body, a front cross member extending in the vehicle width direction and interconnecting the pair of side members, both end portions of which are connected to the rear frames at a level which is higher than the side members of the vehicle body, and a rear cross member extending in the vehicle width direction and interconnecting respective rear end portions of the pair of side members, both end portions of which are connected to the rear frames at a level which is higher than the side members of the vehicle body, wherein the front cross member is configured in substantially a V shape in a front view such that the front cross member slants continuously from the both end portions thereof toward a central portion, in the vehicle width direction, thereof which is located below the rear differential, and that a center position, in the vehicle width direction, of a bottom portion of the front cross member which corresponds to an apex portion of the V shape is offset from a center of the vehicle body in the vehicle width direction toward a specified side which matches an offset-arrangement side of the ring gear arranged in the rear differential.

In a rear-wheel drive type of automotive vehicle, the rear differential to transmit a drive force from an engine to the both rear wheels by way of a differential mechanism is provided at the rear portion of the vehicle body, and the ring gear which constitutes part of the differential mechanism and has a relatively large diameter is arranged inside the rear differential. Herein, in general, this ring gear is arranged at a position which is offset from the center of the rear differential toward a specified side in the vehicle width direction. Accordingly, the rear differential is generally configured such that the casing size of an half part of the rear differential where the ring gear is located is relatively large (big), whereas the casing size of another half part of the rear differential where the ring gear is not located is relatively small (slender).

In the present invention described above, since the center position, in the vehicle width direction, of the bottom portion of the front cross member is offset from the center of the vehicle body in the vehicle width direction toward the offset-arrangement side of the ring gear arranged in the rear differential, the shape of part of the V-shaped front cross member in the front view which is located on the opposite side to the offset-arrangement side of the ring gear can be straight as much as possible, even ensuring a sufficiently large space formed below this part of the V-shaped front cross member for arranging some component, such as the exhaust pipe or the like. Thereby, the NVH performance of the front cross member can be improved properly without reinforcing the front cross member.

That is, since the casing size of the half part of the rear differential where the ring gear is not located is relatively small and slender as described above, even if the part of V-shaped front cross member located on the side where the ring gear is not located, i.e., the part of the V-shaped front cross member located on the opposite side to the offset-arrangement side of the ring gear, is configured to slant straightly from its end portion toward its bottom portion, its straight-slant angle can be as gentle (small) as possible by utilizing the above-described characteristic casing size. Consequently, the sufficiently large space can be formed at a position below the part of V-shaped front cross member located on the side where the ring gear is not located (located on the opposite side to the offset-arrangement side of the ring gear). Thereby, the exhaust pipe or the like can be effectively positioned in this large space, without interfering with the front cross member.

Thus, the above-described present invention can properly restrain the weight increase caused by reinforcing and improve the NVH performance, avoiding any interference with the front cross member.

According to an embodiment of the present invention, the front cross member is configured such that, in the front view, a shape of part of the V-shaped front cross member which is located on an opposite side to the offset-arrangement side of the ring gear is slightly curved upward, compared to a shape of part of the V-shaped front cross member which is located on the offset-arrangement side of the ring gear.

Herein, it is preferable that the part of the V-shaped front cross member located on the opposite side to the offset-arrangement side of the ring gear be configured to include a bending portion which bends upward.

In the above-described embodiments, the above-described space formed below the part of V-shaped front cross member located on the side where the ring gear is not located (located on the opposite side to the offset-arrangement side of the ring gear) can be enlarged properly.

Other features, aspects, and advantages of the present invention will become apparent from the following description which refers to the accompanying drawings.

DETAILED DESCRIPTION OF THE INVENTION

Figure 1:
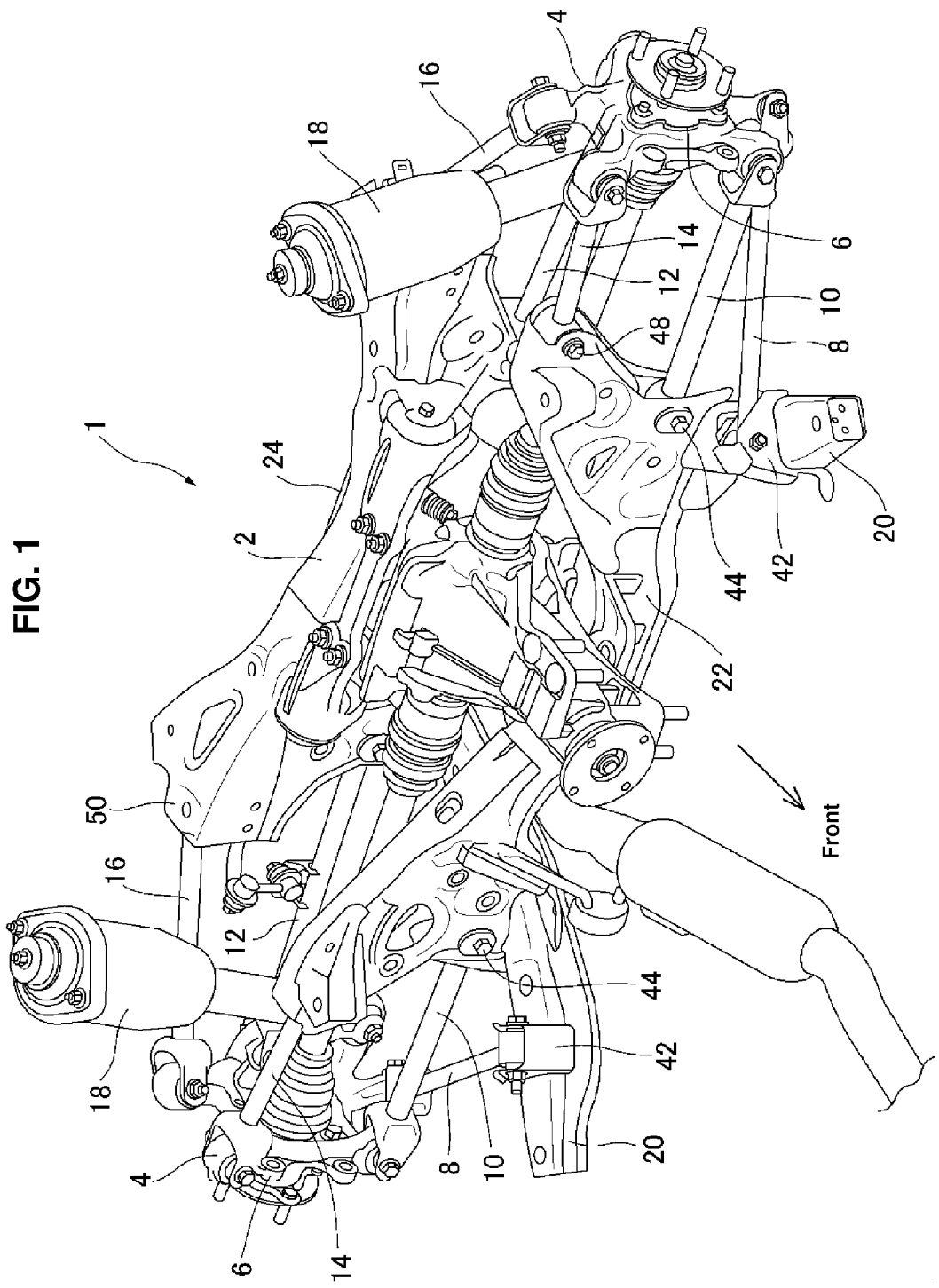
FIG. 1 is a perspective view of a rear suspension device to which a rear sub frame of an automotive vehicle according to an embodiment of the present invention is applied, when viewed obliquely from the front and the left of a vehicle body.

Hereinafter, a rear sub frame of an automotive vehicle according to an embodiment of the present invention will be described referring to the accompanying drawings. A rear suspension device to which the rear sub frame of the automotive vehicle according to the present invention is applied will be described referring to FIG. 1 first. FIG. 1 is a perspective view of the rear suspension device to which the rear sub frame of the automotive vehicle according to the embodiment of the present invention is applied, when viewed obliquely from the front and the left of a vehicle body.

In FIG. 1, reference character 1 denotes the rear suspension device. The rear suspension device 1 of the present embodiment is provided at a rear-wheel drive vehicle in which a rear differential is provided below a rear portion of a vehicle body and rear wheels are driven. The rear suspension device 1 mainly comprises a rear sub frame 2 and a pair of rear suspensions 4 which are provided on both sides, in a vehicle width direction, of the rear sub frame 2.

The rear suspension 4 is a multi-link type of suspension in which a wheel-support member 6 of the rear wheel is coupled to the vehicle body via five independent suspension links so as to move vertically. The five suspension links include three lower links and two upper links. Further, a lower end portion of a suspension damper 18 is coupled to the wheel-support member 6.

Figure 2:
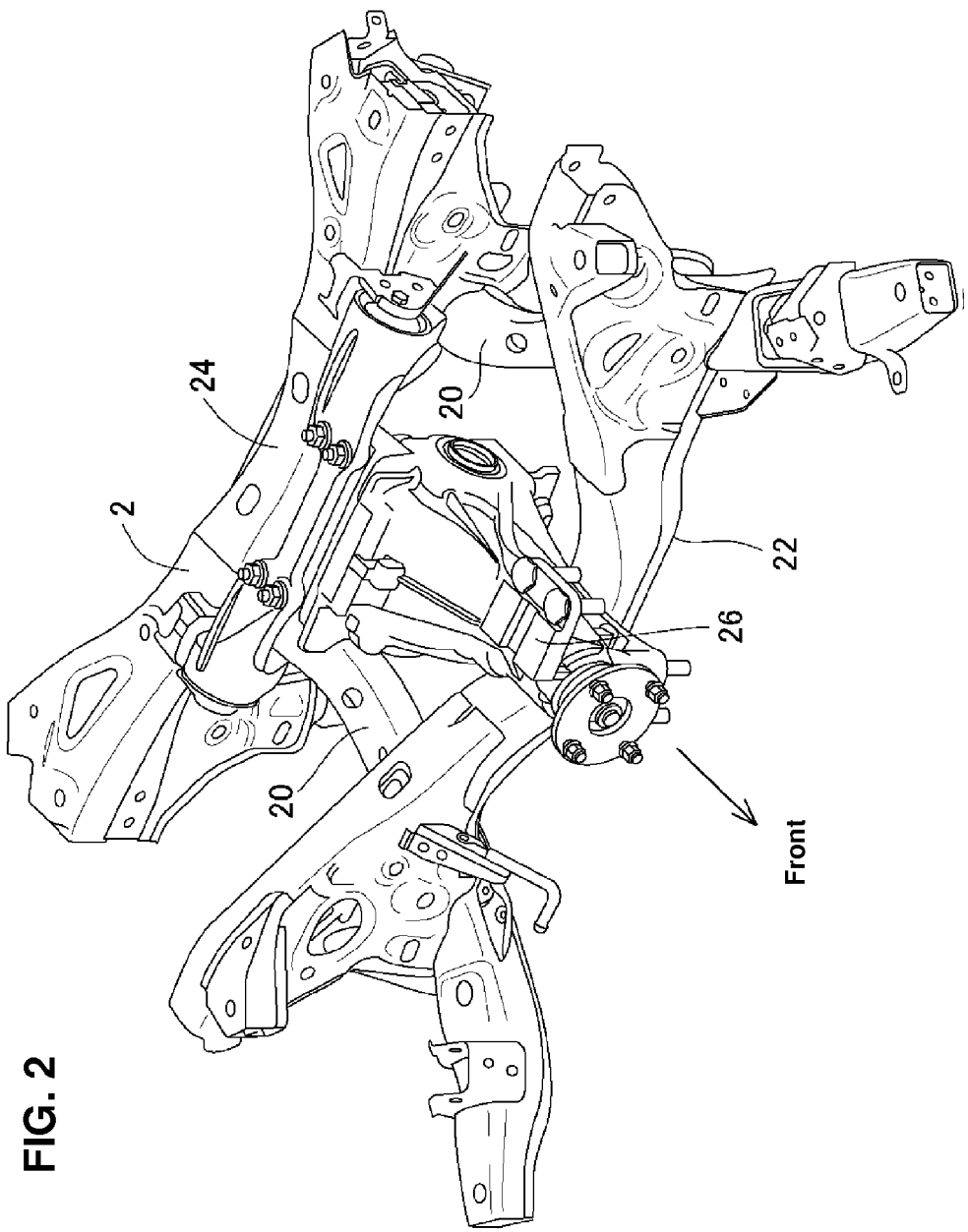
FIG. 2 is a perspective view of the rear sub frame of the automotive vehicle according to the embodiment of the present invention, when viewed obliquely from the front and the left of the vehicle body.
Figure 3:
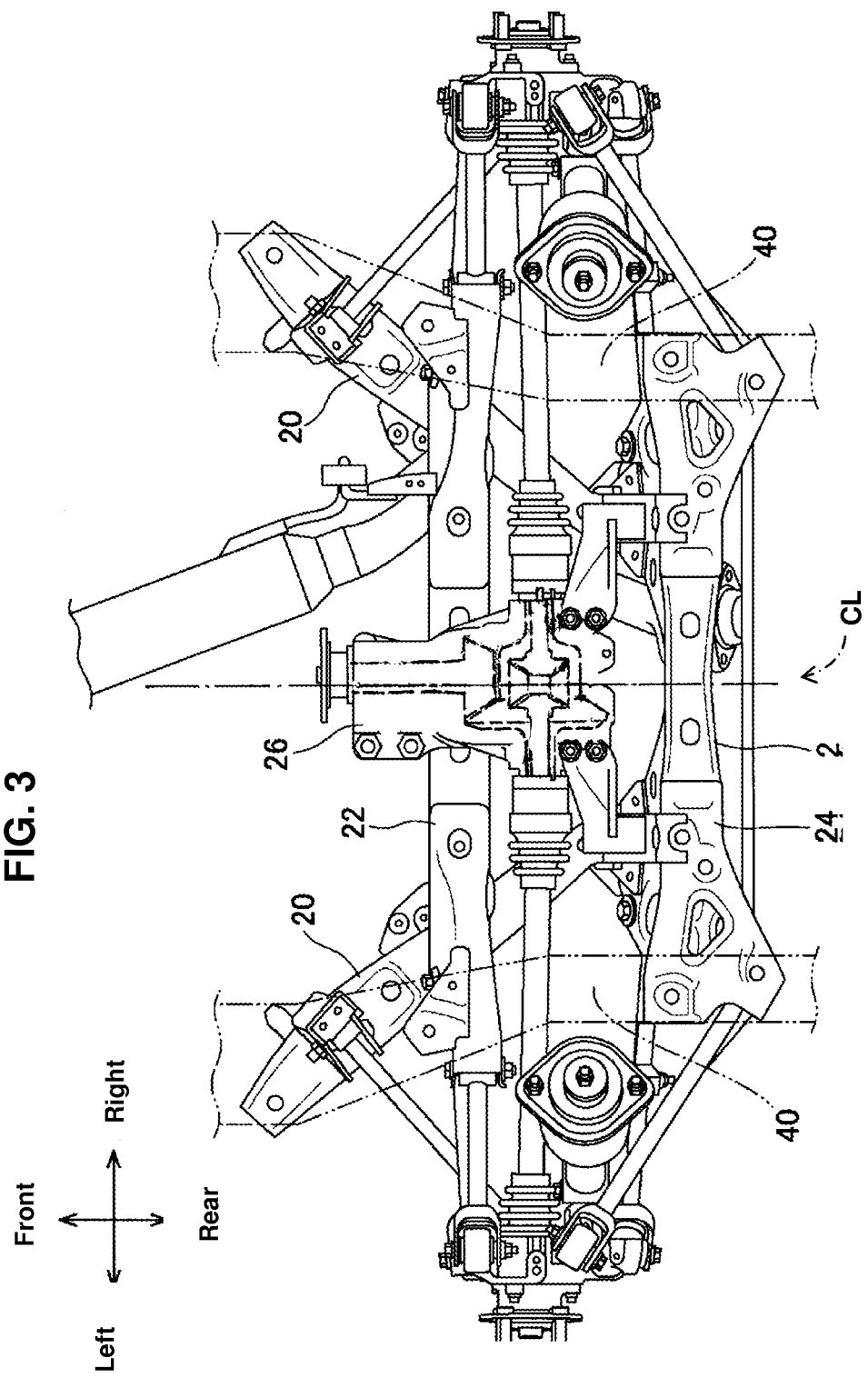
FIG. 3 is a plan view of the rear sub frame of the automotive vehicle according to the embodiment of the present invention, when viewed from above of the vehicle body.

Next, the rear sub frame of the automotive vehicle according to the embodiment of the present invention will be described referring to FIGS. 2 through 4. FIG. 2 is a perspective view of the rear sub frame of the automotive vehicle according to the embodiment of the present invention, when viewed obliquely from the front and the left of the vehicle body, FIG. 3 is a plan view of the rear sub frame of the automotive vehicle according to the embodiment of the present invention, when viewed from above of the vehicle body, and FIG. 4 is a front view of the rear sub frame of the automotive vehicle according to the embodiment of the present invention, when viewed from the front of the vehicle body.

The rear sub frame 2 comprises a pair of right-and-left side members 20 which extend in a vehicle longitudinal direction at both sides, in the vehicle width direction, of the vehicle body, a front cross member 22 which extends in the vehicle width direction and interconnects the pair of side members 20, and a rear cross member 24 which extends in the vehicle width direction and interconnects respective rear end portions of the pair of side members 20. The side members 20, the front cross member 22, and the rear cross member 24 are made from metal (iron-based metal, aluminum alloy, or the like, for example) and configured to have a closed cross section, respectively.

Figure 4:
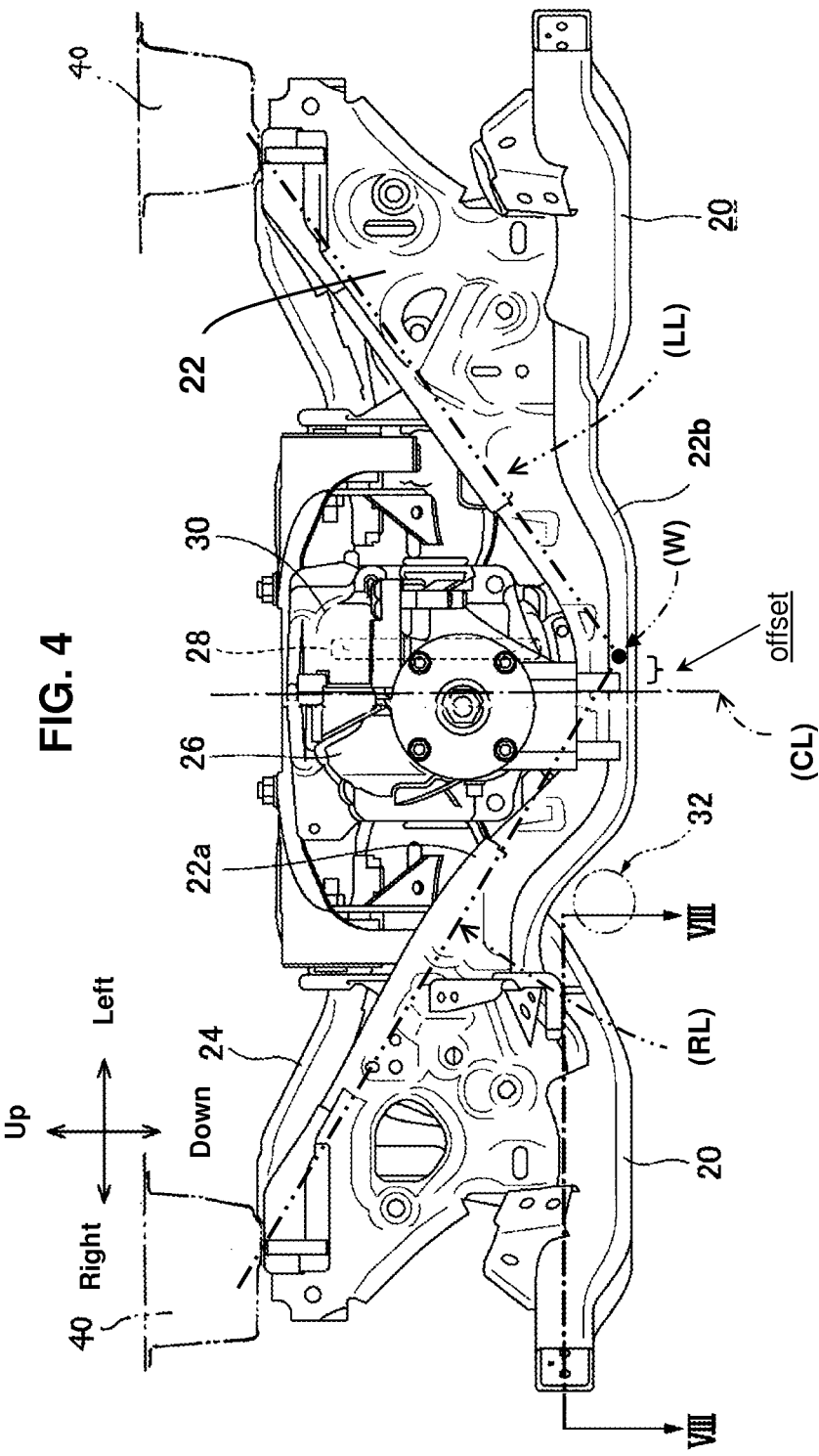
FIG. 4 is a front view of the rear sub frame of the automotive vehicle according to the embodiment of the present invention, when viewed from the front of the vehicle body.

As shown in FIG. 4 particularly, the pair of side members 20 extend in the vehicle longitudinal direction and are configured such that the distance between their front end portions is greater than the distance between their rear end portions. That is, the pair of side members 20 are configured such that each of them straightly extends forward in the vehicle longitudinal direction, and also outward in the vehicle width direction. Further, each of the side members 20 is configured to gently curve downward in a side view.

The front cross member 22 interconnects the right-and-left side members 20 at around a middle position between respective front end portions and respective rear end portions of the pair of side members 20, specifically at a position which is located slightly forward of the middle position, in the vehicle longitudinal direction, of the side members 20. Further, the front cross member 22 is configured in substantially a V shape in a front view such that the front cross member 22 slants continuously from both end portions thereof toward a central portion, in the vehicle width direction, thereof. The level of the both end portions of the front cross member 22 is higher than the side members 20. The front cross member 20 is connected to a middle position between the front end portion and the rear end portion of each of the right-and-left side members 20 at a middle portion between its central portion and its end portion.

The front cross member 22 is provided to extend below a rear differential 26 which is attached to the rear portion of the vehicle body in a state in which the rear sub frame 2 is attached to a kick-up portion and rear frames of the vehicle body as shown in FIGS. 3 and 4 particularly. That is, the rear differential 26 is positioned between a lower face of the rear portion of the vehicle body and the front cross member 22.

The front cross member 22 is also configured, as shown in FIG. 4, such that a center position, in the vehicle width direction, of its bottom portion (which corresponds to an apex portion of the V shape of the front cross member 22) is offset from a center (CL) (illustrated by a one-dotted broken line) of the vehicle body in the vehicle width direction to the left side of the vehicle body in the present embodiment. That is, a point (W) which corresponds to an intersection of an extending line (LL) of the left-side part of the V-shaped front cross member 22 and an extending line (RL) of the right-side part of the V-shaped front cross member 22 is located at an offset position from the center (CL) of the vehicle body in the vehicle width direction.

Herein, in general, the rear differential 26 stores a ring gear 28 (illustrated by a broken line in FIG. 4) in its gear case 30 which constitutes part of a differential mechanism of the rear differential 26, and this ring gear 28 is arranged at a position which is offset from the center of the rear differential 26 in the vehicle width direction. In the present embodiment shown in FIG. 4, the position of the ring gear 28 is offset from the center of the rear differential 26 to the left side of the vehicle body.

Thus, in other words, the front cross member 22 according to the present invention is configured such that the center position, in the vehicle width direction, of its bottom portion which corresponds to the apex portion of the V shape is offset from the center (CL) of the vehicle body in the vehicle width direction toward the specified side (the left side in the present embodiment) which matches the offset-arrangement side (the left side in the present embodiment) of the ring gear 28 arranged in the rear differential 26.

Further, the right-side part of the V-shaped front cross member 22 which is located on the side where the ring gear 28 is not arranged in the rear differential 26 includes a bending portion 22a which bends upward slightly. An exhaust pipe 32 (illustrated by an imaginary line) is arranged below the bending portion 22a in the state in which the rear sub frame 22 is attached to the rear portion of the vehicle body from below.

The rear cross member 24 is connected to the rear end portions of the pair of right-and-left side members 20 at its central portion. Both end portions of the rear cross member 24 extend outward slightly beyond the rear end portions of the side members 20, and are located at a higher level than the rear end portions of the side members 20. The level of the both end portions of the front cross member 22 is almost the same as the level of the both end portions of the rear cross member 24.

Herein, the side members 20, the front cross member 22, and the rear cross member 24 are joined to each other by welding, for example.

In the present embodiment, as shown in FIGS. 3 and 4, an input shaft of the rear differential 26 which is coupled to a propeller shaft (not illustrated) is arranged such that its shaft center is slightly (about 5 mm) offset from the center (CL) of the vehicle body to the right side of the vehicle body.

Figure 5:
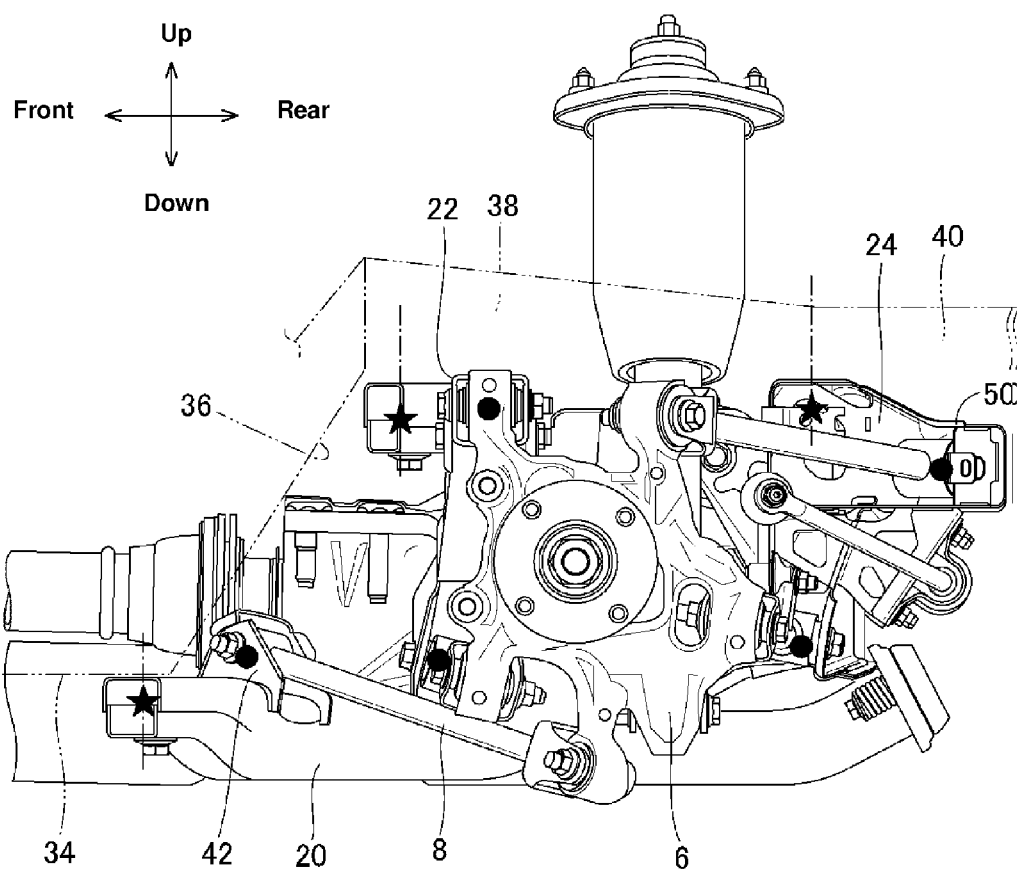
FIG. 5 is a side view of the rear suspension device to which the rear sub frame of the automotive vehicle according to the embodiment of the present invention is applied, when viewed from the left of the vehicle body.

Next, an attachment of the rear sub frame of the automotive vehicle according to the embodiment of the present invention to the vehicle body will be described referring to FIG. 5. FIG. 5 is a side view of the rear suspension device to which the rear sub frame of the automotive vehicle according to the embodiment of the present invention is applied, when viewed from the left of the vehicle body. Attachment points of the rear sub frame 2 to the vehicle body are denoted by black-star marks in FIG. 5.

The vehicle body comprises a vehicle-compartment floor portion 34 which forms a bottom face of a vehicle compartment, a kick-up portion 36 which extends obliquely upward and rearward from a rear end of the vehicle-compartment floor portion 34, and a rear panel portion 38 which extends horizontally rearward from an upper end of the kick-up portion 36. A rear portion of the kick-up portion 36 bends toward a horizontal direction and connects to the rear panel portion 38. Further, a pair of rear side frames 40 (rear frames) which extend in the vehicle longitudinal direction at the both sides, in the vehicle width direction, of the vehicle body are joined to a lower face of the rear panel portion 38.

Respective front end portions of the right-and-left side members 20 of the rear sub frame 2 are connected to a lower face of a front portion of the kick-up portion 36. Further, the both end portions of the front cross member 22 are connected to lower faces of respective front end portions of the right-and-left rear side frames 40. Particularly, as shown in FIG. 5, connection portions of the front cross member 22 to the rear side frames 40 are located forward of the front cross member 22. Further, the both end portions of the rear cross member 24 are connected to lower faces of respective rear portions of the right-and-left rear side frames 40.

Figure 6:
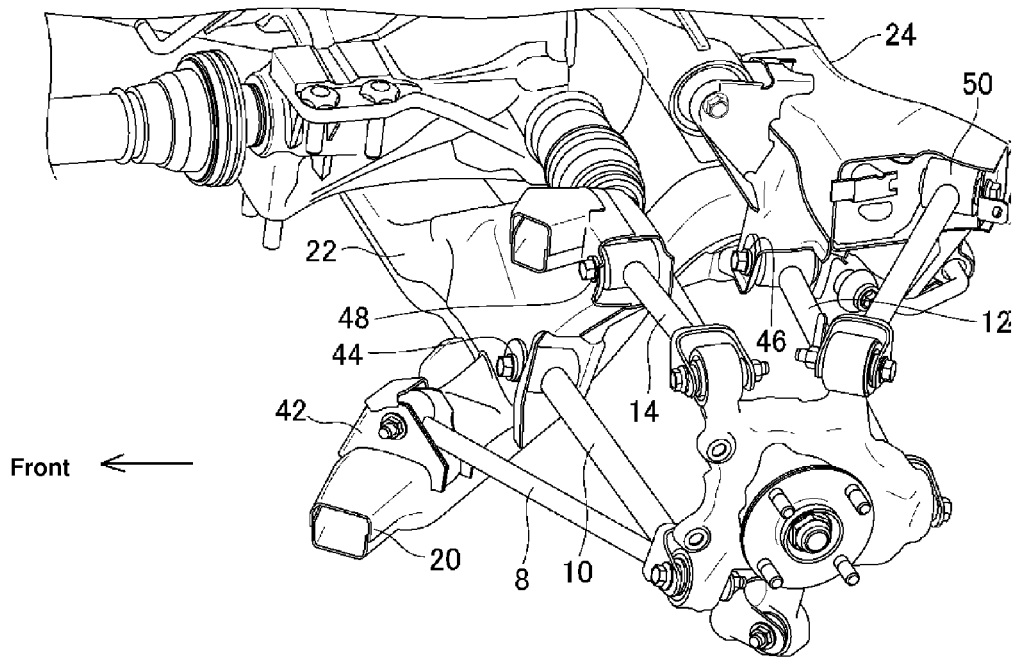
FIG. 6 is a partially-enlarged perspective view showing a connection position and its surrounding portion where the rear sub frame of the automotive vehicle according to the embodiment of the present invention is connected to a rear side frame, when viewed obliquely from the front and the left of the vehicle body.
Figure 7:
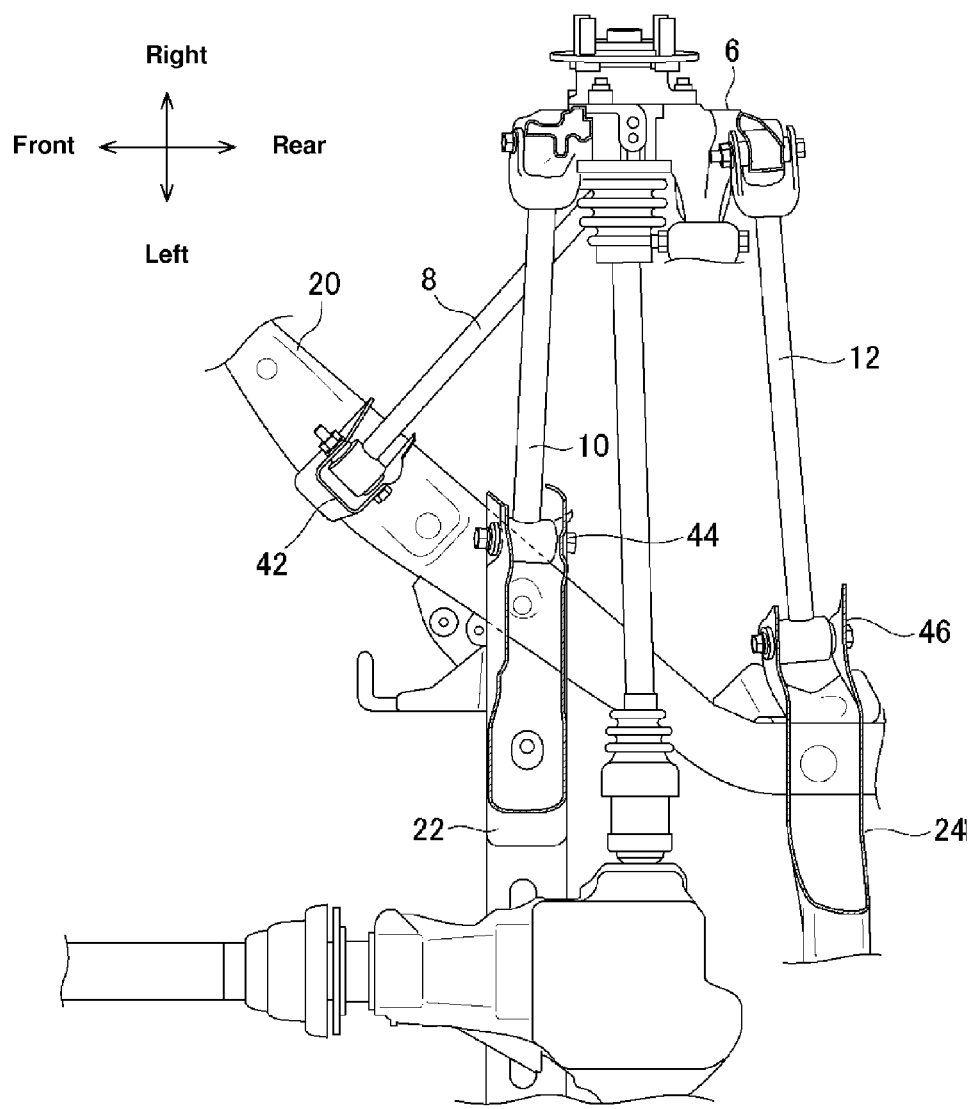
FIG. 7 is a partially-enlarged plan view showing a connection position and its surrounding portion where suspension links are connected to a right-side side member, when viewed from above of the vehicle body.

Next, an attachment structure of the suspension links to the rear sub frame 2 will be described specifically referring to FIGS. 1, 5 through 7. FIG. 6 is a partially-enlarged perspective view showing a connection position and its surrounding portion where the left end portion of the front cross member 22 and the left end portion of the rear cross member 24 are connected to the rear side frame 40, when viewed obliquely from the front and the left of the vehicle body. FIG. 7 is a partially-enlarged plan view showing a connection position and its surrounding portion where the suspension links are connected to the right-side side member 20, when viewed from above of the vehicle body. Attachment points of the above-described five suspension links to the rear sub frame 2 are denoted by black-circle marks in FIG. 5.

The five suspension links are attached to the right-and-left both sides of the rear sub frame 2, respectively. Specifically, as shown in FIGS. 1, 5 and 6, respective attachment portions 42 which project upward are provided at upper-face sides of the front end portions of the pair of side members 20, and a vehicle-body-side end portion of a front-side front lower link 8 (trailing link) is attached to each of the attachment portions 42 via a rubber bush. As shown in FIG. 7, the front lower link 8 extends obliquely outward and rearward from the attachment portion 42 and connects to the wheel-support members 6 at its wheel-side end portion.

Next, as shown in FIGS. 1, 6 and 7, respective attachment portions 44 which project outward in the vehicle width direction are provided at upper-face sides of the connection portions of the front cross member 22 to the pair of side members 20, and a vehicle-body-side end portion of a center-side center lower link 10 is attached to each of the attachment portions 44 via a rubber bush. The center lower link 10 extends outward from the attachment portion 44 and connects to the wheel-support members 6 at its wheel-side end portion.

Next, as shown in FIGS. 6 and 7, respective attachment portions 46 which project downward are provided at lower-face sides of the both end portions of the rear cross member 24, and a vehicle-body-side end portion of a rear-side rear lower link 12 (toe control link) is attached to each of the attachment portions 46 via a rubber bush. As shown in FIGS. 1 and 7, the rear lower link 12 extends outward in the vehicle width direction from the attachment portion 46 and connects to the wheel-support members 6 at its wheel-side end portion.

Next, as shown in FIGS. 1 and 6, respective attachment portions 48 which project outward in the vehicle width direction from the both ends of the front cross member 22 are provided at the front cross member 22, and a vehicle-body-side end portion of a front-side front upper link 14 (lateral link) is attached to each of the attachment portions 48 via a rubber bush. That is, as shown in FIGS. 5 and 6, the attachment portion 48 is arranged rearward of the connection portion of the front cross member 22 to the rear side frame 40. The front upper link 14 extends outward from the attachment portion 48 and connects to the wheel-support members 6 at its wheel-side end portion.

Next, as shown in FIGS. 1, 5 and 6, respective attachment portions 50 which project rearward from the both ends of the rear cross member 24 are provided at the rear cross member 24, and a vehicle-body-side end portion of a rear-side rear upper link 16 (leading link) is attached to each of the attachment portions 50 via a rubber bush. That is, as shown in FIGS. 5 and 6, the attachment portion 50 is arranged rearward of the connection portion of the rear cross member 24 to the rear side frame 40. The rear upper link 16 extends obliquely forward and outward from the attachment portion 50 and connects to the wheel-support members 6 at its wheel-side end portion as shown in FIGS. 1, 5 and 6.

Figure 8:
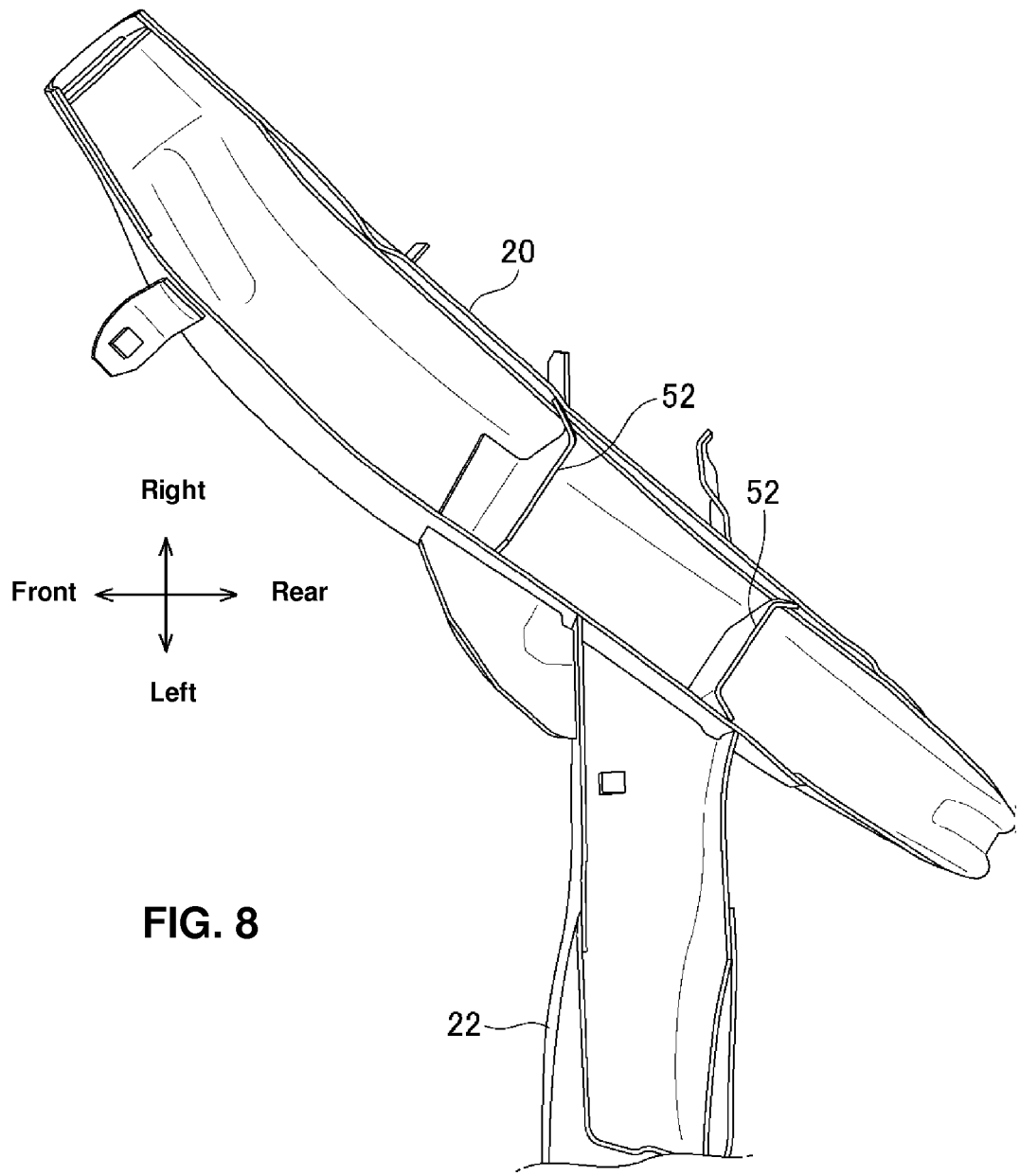
FIG. 8 is a view taken along line VIII-VIII of FIG. 4, which shows an internal structure of the right-side side member.

Next, a structure around the attachment portion 42 of the front lower link 8 to the side member 20 will be described specifically referring to FIGS. 7 and 8. FIG. 8 is a view taken along line VIII-VIII of FIG. 4, which shows an internal structure of the right-side side member 20.

First, as shown in FIG. 7, the side member 20 is configured such that the width in a section thereof which is perpendicular to its longitudinal direction expands toward the attachment portion 42 of the front lower link 8 from its front and rear ends. That is, the side member 20 has the widest sectional area perpendicular to its longitudinal direction at a point right below the attachment portion 42.

As described above, the side member 20 is made from metal so as to have the closed cross section. And, as shown in FIG. 8, a pair of flat-plate shaped reinforcing members 52 are provided inside the side member 20 at a position below a connection point of the side member 20 to the front cross member 22. The reinforcing members 52 are arranged perpendicularly to the longitudinal direction of the side member 20. Specifically, the reinforcing members 52 are provided perpendicularly to the longitudinal direction of the side member 20 respectively at a point below a vehicle-body front wall face of the front cross member 22 and another point below a vehicle-body rear wall face of the front cross member 22. These reinforcing members 52 are joined to an inner wall of the side member 20 by welding, for example.

Figure 9:
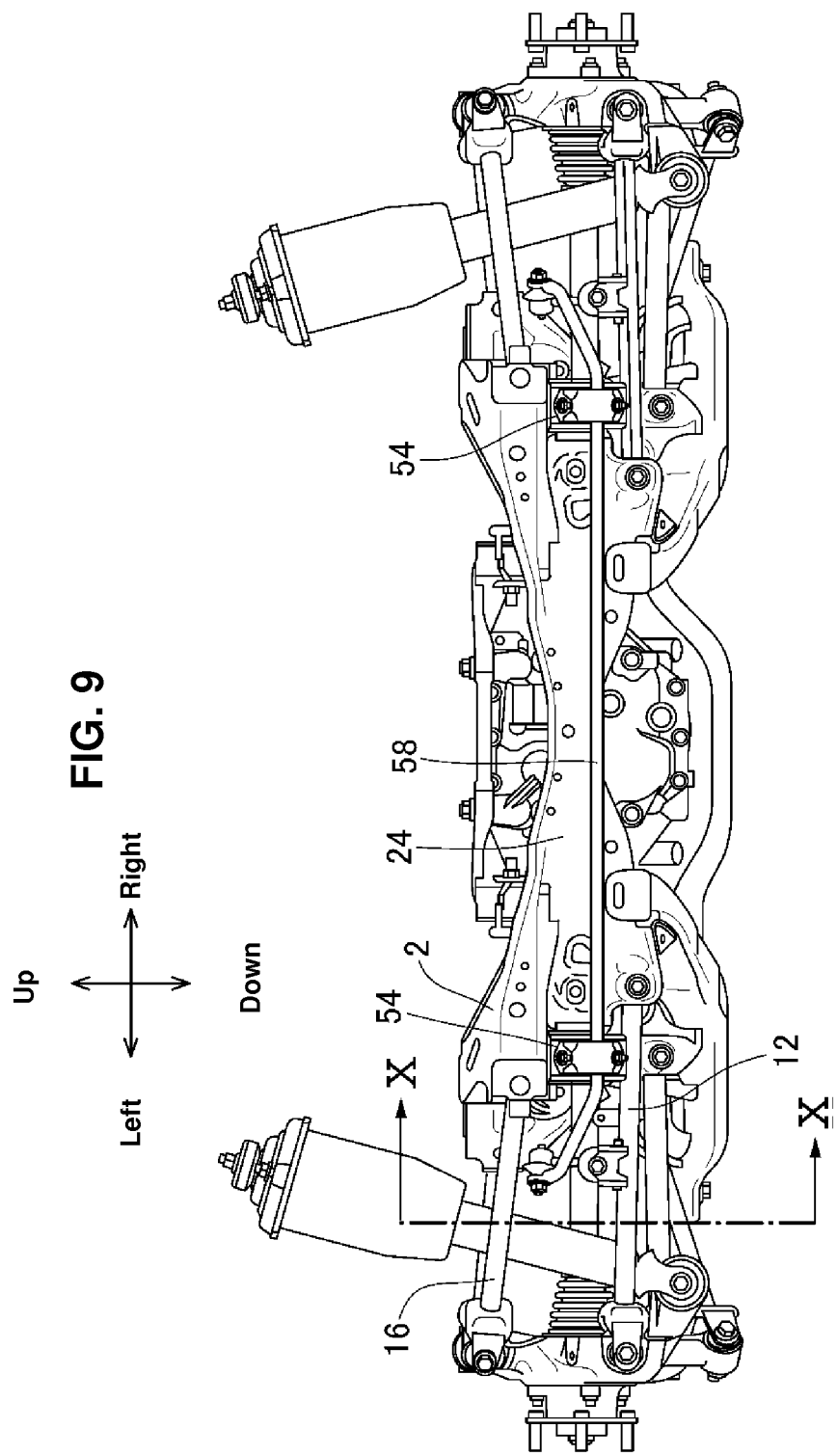
FIG. 9 is a back view of the rear sub frame of the automotive vehicle according to the embodiment of the present invention, when viewed from the rear of the vehicle body.
Figure 10:
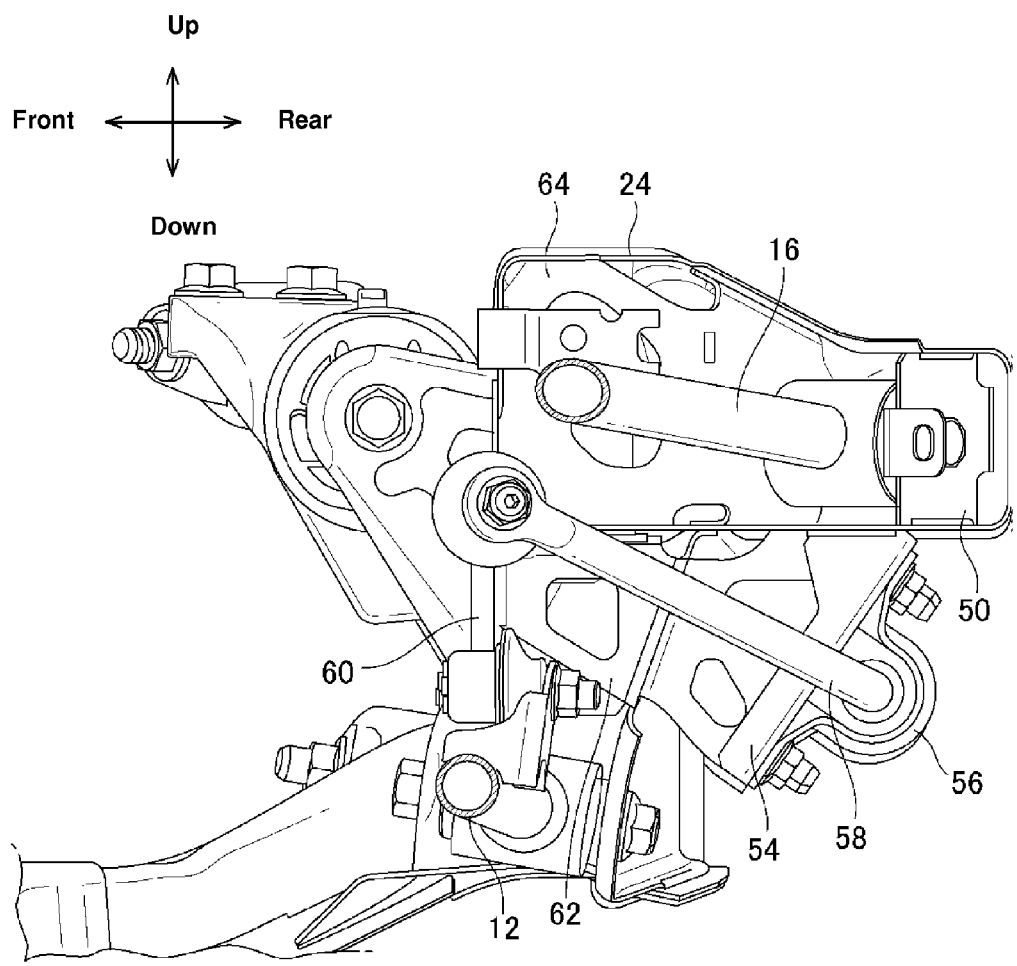
FIG. 10 is a view taken along line XI-X of FIG. 9, which shows around a stabilizer-support pedestal of a rear cross member of the sub frame according to the embodiment of the present invention.
Figure 11:
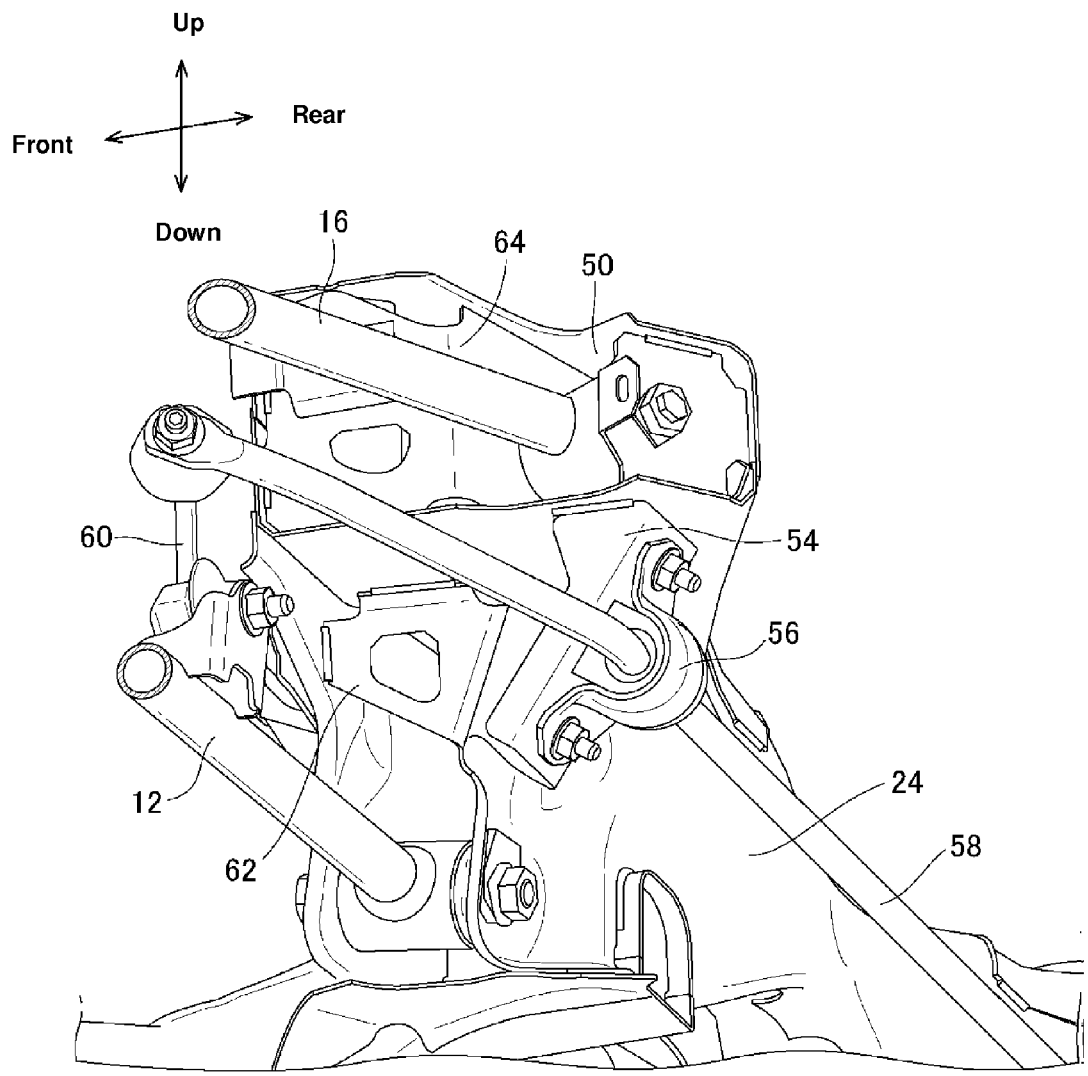
FIG. 11 is a partially-enlarged perspective view showing around the stabilizer-support pedestal of the rear cross member of the sub frame according to the embodiment of the present invention, when viewed obliquely from the rear and the left of the vehicle body.

Next, an attachment structure of a stabilizer to the rear sub frame 2 will be described referring to FIGS. 9 through 11. FIG. 9 is a back view of the rear sub frame of the automotive vehicle according to the embodiment of the present invention, when viewed from the rear of the vehicle body. FIG. 10 is a view taken along line XI-X of FIG. 9, which shows around a stabilizer-support pedestal of the rear cross member 24 according to the embodiment of the present invention. FIG. 11 is a partially-enlarged perspective view showing around the stabilizer-support pedestal of the rear cross member 24 according to the embodiment of the present invention, when viewed obliquely from the rear and the left of the vehicle body.

First, as shown in FIG. 9, a pair of stabilizer pedestals 54 are provided rearward of the right-and-left both end portions, in the vehicle width direction, of the rear cross member 24. Specifically, as shown in FIG. 10, the stabilizer pedestal 54 is provided to connect a lower face of the attachment portion 50 of the rear upper link 16 which projects rearward from the end portion of the rear cross member 24 and a rear face of the rear cross member 24. Further, as shown in FIGS. 9 and 10, a stabilizer 58 is fixed to a rear side of the stabilizer pedestals 54 by using stabilizer brackets 56. The stabilizer 58 extends outward in the vehicle width direction beyond the stabilizer pedestals 54, and respective wheel-side both end portions of the stabilizer 58 are coupled to the respective rear lower links 12 via a pair of links 60, for example.

The rear cross member 24 is made from metal so as to have the closed cross section as described above. And, as shown in FIG. 11, a flat-plate shaped reinforcing members 62 is provided inside the rear cross member 24 at a position forward of the stabilizer pedestals 54. The reinforcing members 62 is arranged perpendicularly to the longitudinal direction of the rear cross member 24. Further, a flat-plate shaped reinforcing members 64 is provided inside the rear cross member 24 at a position forward of the attachment portion 50 of the rear upper link 16. The reinforcing members 64 is arranged perpendicularly to the longitudinal direction of the rear cross member 24. These reinforcing members 62, 64 are joined to an inner wall of the rear cross member 24 by welding, for example.

Hereinafter, the effects of the above-described rear sub frame of the automotive vehicle according to the embodiment of the present invention will be described.

First, since the center position, in the vehicle width direction, of the bottom portion of the front cross member 22 which corresponds to the apex portion of the V-shaped front cross member 22 is offset from the center (CL) of the vehicle body in the vehicle width direction toward the offset-arrangement side of the ring gear 28 arranged in the rear differential 26 in the front view, a sufficiently large space can be formed at a position below the right-side part of V-shaped front cross member 22 located on the side where the ring gear 28 is not located (located on the opposite side to the offset-arrangement side of the ring gear 28). Thereby, in a case in which the exhaust pipe 32 is arranged in this space, the shape of the right-side part of the V-shaped front cross member 22 located on the side where the ring gear 28 is not located (located on the opposite side to the offset-arrangement side of the ring gear 28) can be straight as much as possible, avoiding any interference with the exhaust pipe 32. Thereby, the NVH performance of the front cross member 22 can be improved properly without reinforcing the front cross member 22. That is, the present invention can properly restrain any weight increase caused by reinforcing and improve the NVH performance, avoiding any interference of the right-side part of the front cross member 22 with the exhaust pipe 32.

Further, since the right-side part of the V-shaped front cross member 22 located on the side where the ring gear 28 is not located (located on the opposite side to the offset-arrangement side of the ring gear 28) includes the bending portion 22a bending upward, the above-described space formed below the right-side part of V-shaped front cross member 22 can be enlarged properly, so that avoidance of the interference of the right-side part of the front cross member 22 with the exhaust pipe 32 can be surely attained.

Moreover, the connection point of the front cross member 22 of the rear sub frame 2 to the rear side frame 40 of the vehicle body is arranged forward of the attachment portion 48 of the front upper link 14 to the rear sub frame 2 and the connection point of the rear cross member 24 to the rear side frame 40 of the vehicle body is arranged forward of the attachment portion 50 of the rear upper link 16 to the rear sub frame 2. Accordingly, the rear sub frame 2 can be properly provided with the necessary rigidity in a state in which the vehicle is completed with the rear side frames 40 and the rear sub frame 2 combined together merely by reinforcing the rear side frames 40 up to its position which is located forward of the attachment portion 50 of the rear upper link 16, so that the longitudinal length of the rear side frames 40 to be reinforced can be properly short. Accordingly, the rigidity of the rear sub frame 2 can be properly increased in the state in which the rear sub frame 2 is attached to the rear side frames 40, restraining the weight increase of the rear side frames 40. Also, since the rear sub frame 2 can be properly provided with the necessary rigidity in the state in which the vehicle is completed with the rear side frames 40 and the rear sub frame 2 combined together merely by reinforcing the rear side frames 40 up to the position located forward of the attachment portion 50 of the rear upper link 16 as described above, the weight increase by reinforcing can be concentrated on a central side of the vehicle, so that the turning performance of the vehicle can be improved. Moreover, since the connection points of the front and rear cross members 22, 24 of the rear sub frame 2 to the rear side frames 40 of the vehicle body are arranged to be offset from the attachment portions 48, 50 of the front and rear upper links 14, 16 to the rear sub frame 2 in the longitudinal direction, respectively, the connection points of the front cross member 22 and the rear cross member 24 to the vehicle body can be provided at the pair of right-and-left rear side frames 40 arranged at the outward side of the vehicle body, which are high-rigidity members, without interfering with the attachment portions 48, 50 of the front and rear upper links 14, 16. Accordingly, the length, in the vehicle width direction, of the vehicle body which receives a load from the rear sub frame 2 can be properly long, so that the resistance against torsion and the like when the vehicle body receives the load from the rear sub frame 2 can be improved.

Also, even in a case which the vehicle-body-side attachment portion 50 of the rear upper link 16 is located greatly rearward of the vehicle's wheel in order to increase a forward-inclination angle of the rear upper link 16 for improving the performance of the rear suspension device 1, the longitudinal length of the rear side frames 40 to be reinforced can be properly short by reinforcing the rear side frames 40 up to the position located forward of the attachment portion 50 of the rear upper link 16. Further, while the drive shafts and the suspension damper 18 which move vertically are arranged between the front upper link 14 and the rear upper link 16 in the multi-link type of rear suspension device 1, the connection point of the front cross member 22 to the vehicle body is arranged forward of the vehicle-body-side attachment portion 48 of the front upper link 14, so that it can be properly prevented that the drive shafts and the suspension damper 18 interfere with this connection point or attaching works of these members deteriorate.

Further, since the side member 20 is configured such that the width in its section which is perpendicular to its longitudinal direction expands toward the attachment portion 42 of the front lower link 8 from its front and rear ends, the rigidity against bending and the rigidity against torsion at a portion of the side member 20 around the attachment portion 42 of the front lower link 8 can be improved. Thereby, the rigidity of the side member 20 against a force which is transmitted to the side member 20 from the front lower link 8 via the attachment portion 42 can be improved. Herein, it is unnecessary that any additional reinforcing member is provided or the attachment portion 42 is provided near the connection portion of the side member 20 to the front cross member 22 or the rear cross member 24, so that the weight increase by reinforcing is not caused or the attachment position of the front lower link 8 is not improperly limited, and the rigidity of the side member 20 against the force from the front lower link 8 can be improved.

Moreover, since the flat-plate shaped reinforcing member 52 arranged perpendicularly to the longitudinal direction of the side member 20 is provided at the position below the connection position to the front cross member 22, the rigidity of the side member 20 against the force applied to the side member 20 from the front cross member 22 as well as against the force applied to the side member 20 from the front lower link 8 via the attachment portion 42 can be improved, so that the responsiveness and the rigidity for the driving operation of the driver can be improved more.

Also, since the stabilizer pedestal 54 is provided to connect the lower face of the attachment portion 50 of the rear upper link 16 projecting rearward from the end portion of the rear cross member 24 and the rear face of the rear cross member 24, the attachment portion 50 of the rear upper link 16 can be restrained from bending upward or downward by the stabilizer pedestal 54. Accordingly, bending of the attachment portion 50 caused by the force applied to the rear upper link 16 can be properly restrained, without any weight increase by reinforcing.

Further, since the flat-plate shaped reinforcing member 62 arranged perpendicularly to the longitudinal direction of the rear cross member 24 is provided in the rear cross member 24 at the position forward of the connection position to the stabilizer pedestal 54, the rigidity of the rear cross member 24 against the force applied to the rear cross member 24 from the rear upper link 16 via the attachment portion 50 and the stabilizer pedestal 54 can be improved, so that bending of the attachment portion 50 of the rear upper link 16 can be more surely restrained.

Moreover, since the flat-plate shaped reinforcing member 64 arranged perpendicularly to the longitudinal direction of the rear cross member 24 is provided in the rear cross member 24 at the position forward of the attachment portion 50 of the rear upper link 16, the rigidity of the rear cross member 24 against the force applied to the rear cross member 24 from the rear upper link 16 via the attachment portion 50 can be improved, so that bending of the attachment portion 50 of the rear upper link 16 can be more surely restrained.

Also, since the pair of side members 20 are configured to extend forward from the connection position to the rear cross member 24 to the front portion of the kick-up portion 36 of the vehicle body such that the distance between their front end portions is greater than the distance between their rear end portions, a load generated in a vehicle rear collision is directly transmitted to the rear portion of the kick-up portion 36 by way of the rear side frames 40 and also to the front portion of the kick-up portion 36 by way of the side members 20. That is, part of the load generated in the vehicle rear collision is dispersed to the side member 20, so that the magnitude of the load applied to the bending portion at the rear portion of the kick-up portion 36 can be reduced, thereby the slant angle of the kick-up portion 36 can be increased, preventing the rear portion of the kick-up portion from having budding. Accordingly, the longitudinal length of the vehicle body rearward of the vehicle compartment can be shortened, ensuring a body strength against the load generated in the vehicle rear collision which is similar to or better than that of the conventional structure.

Additionally, a space for arranging wheel-driving axels can be formed surely above the side members 20, reducing the magnitude of the load applied to the bending portion at the rear portion of the kick-up portion 36 by dispersing the part of the load generated in the vehicle rear collision to the side member 20.

The present invention should not be limited to the above-described embodiment, and any other modifications or improvements may be applied within the scope of a sprit of the present invention.

What is claimed is:

1. A rear sub frame of an automotive vehicle, which is attached to a kick-up portion and rear frames of a vehicle body at a rear portion of the vehicle body where a rear differential storing a ring gear therein is provided, the ring gear being arranged to be offset from a center position, in a vehicle width direction, of the rear differential, the rear sub frame comprising:
   a pair of side members extending in a vehicle longitudinal direction at both sides, in the vehicle width direction, of the vehicle body, front end portions of which are connected to a front portion of the kick-up portion of the vehicle body;
   a front cross member extending in the vehicle width direction and interconnecting the pair of side members, both end portions of which are connected to the rear frames at a level which is higher than the side members of the vehicle body; and
   a rear cross member extending in the vehicle width direction and interconnecting respective rear end portions of the pair of side members, both end portions of which are connected to the rear frames at a level which is higher than the side members of the vehicle body,
   wherein said front cross member is configured in substantially a V shape in a front view such that the front cross member slants continuously from the both end portions thereof toward a central portion, in the vehicle width direction, thereof which is located below said rear differential, and that a center position, in the vehicle width direction, of a bottom portion of the front cross member which corresponds to an apex portion of the V shape is offset from a center of the vehicle body in the vehicle width direction toward a specified side which matches an offset-arrangement side of said ring gear arranged in the rear differential.

2. The rear sub frame of claim 1, wherein said front cross member is configured such that, in the front view, a shape of part of the V-shaped front cross member which is located on an opposite side to said offset-arrangement side of the ring gear is slightly curved upward, compared to a shape of part of the V-shaped front cross member which is located on said offset-arrangement side of the ring gear.

3. The rear sub frame of claim 2, wherein said part of the V-shaped front cross member located on the opposite side to the offset-arrangement side of the ring gear includes a bending portion which bends upward.

4. The rear sub frame of claim 3, wherein an exhaust pipe of the vehicle is provided to extend in the vehicle longitudinal direction at a position below said bending portion of the part of the V-shaped front cross member located on the opposite side to the offset-arrangement side of the ring gear.

\* \* \* \* \*